United States Patent [19]
Watkins, Jr.

[11] Patent Number: 5,305,805
[45] Date of Patent: Apr. 26, 1994

[54] FIXED HYDRANT CART WITH NON-ARTICULATING COUPLING

[76] Inventor: Robert G. Watkins, Jr., R.D. #5, Coatesville, Pa. 19320

[21] Appl. No.: 967,147

[22] Filed: Oct. 27, 1992

[51] Int. Cl.$^5$ ............................................. B60P 3/00
[52] U.S. Cl. .................................. 141/231; 141/113; 141/279; 137/615; 180/22; 280/4; 280/33.991
[58] Field of Search ............... 141/231, 387, 113, 279; 137/351, 355.12, 615; 180/22; 280/33.991, 4, 839, 830, 837, 838

[56] References Cited

U.S. PATENT DOCUMENTS

| | | |
|---|---|---|
| 1,293,664 | 2/1919 | Avery . |
| 1,303,854 | 5/1919 | Clark . |
| 1,784,975 | 4/1929 | Rosman . |
| 2,044,592 | 6/1936 | Richards . |
| 2,777,606 | 1/1957 | Moore et al. . |
| 2,948,306 | 2/1959 | Kuraeff . |
| 3,169,581 | 2/1965 | Cummins .......................... 280/4 X |
| 3,305,117 | 2/1967 | Ford .......................... 280/33.991 X |
| 3,529,696 | 10/1968 | Jacobsen . |
| 3,641,738 | 2/1972 | Johnson . |
| 3,648,720 | 3/1972 | Kornahrens . |
| 3,938,678 | 2/1976 | Kern . |
| 4,000,924 | 1/1977 | Blasingame . |
| 4,070,807 | 1/1978 | Smith, Jr. . |
| 4,088,203 | 6/1978 | Watkins, Jr. . |
| 4,149,732 | 4/1979 | Watkins, Jr. . |
| 4,162,873 | 7/1979 | Smith, Jr. . |
| 4,180,178 | 12/1978 | Smith, Jr. . |
| 4,188,757 | 2/1980 | Smith, Jr. . |
| 4,231,695 | 11/1980 | Weston, Sr. . |
| 4,245,441 | 1/1981 | Smith, Jr. . |
| 4,272,089 | 6/1981 | Watkins, Jr. . |
| 4,394,027 | 7/1983 | Watkins, Jr. . |
| 4,489,977 | 12/1984 | Earing, Jr. . |
| 4,510,971 | 4/1985 | Bunnelle .......................... 137/615 |
| 4,522,550 | 6/1985 | Whitehouse . |
| 4,755,089 | 5/1988 | Ellgass . |
| 4,886,282 | 12/1989 | Wilkinson et al. . |

FOREIGN PATENT DOCUMENTS 2350308 5/1975 Fed. Rep. of Germany .................... 280/33.991

OTHER PUBLICATIONS

Mobile Equipment Fabricators, Inc. advertisement, date unknown, but prior to Jun. 18, 1992.
"A Manufacturer, an FBO and a Major Airline Help Prove Teamwork Can Pay Off on the Ramp", AGEM 19 (Feb. 1992).
Aircraft Service International-two sheets drawing dated Oct. 22, 1990.
Strato-Lift, Inc., P.O. Box 220 Twin Valley & Hemlock Rd., Morgantown, Pa. 19543.
Dart Refueler Chassis Specifications, Dart Truck Co., Kansas City, Mo. 64141.
Hose Reels, Clifford B. Hannay & Sons, Inc., Westerlo, N.Y. 12193, 1978.
Rampmaster 7 sp tractor-trailer, General Transervice, Inc. Concordville, Pa. 19331 on sale 1988.
DyAir Fueling, Inc., Sky Harbor International Airport 4200 E. Airlaine, Phoenix, Ariz. 85034.

Primary Examiner—Ernest G. Cusick
Attorney, Agent, or Firm—Ratner & Prestia

[57] ABSTRACT

A hydrant refueler is provided for refueling an aircraft. The hydrant refueler is suitable for use in an airport having a hydrant for supplying fuel. The hydrant refueler includes a hydrant cart and a self propelled land vehicle. The hydrant cart includes a fuel hose for coupling to the hydrant, and a delivery fuel hose for coupling to a fuel intake valve of the aircraft. The land vehicle includes a platform for supporting a refueling operator during transportation and during refueling. The platform may be raised and lowered. The platform has controls for operating the land vehicle, and for raising and lowering the platform. The hydrant cart may be attached to the land vehicle for transporting and controlling the hydrant cart. During operation, one end of the delivery fuel hose is raised with the platform to a height for coupling with the aircraft fuel intake valve for conducting fuel to the airplane. The land vehicle and hydrant cart are detached from one another for maintenance and repair.

5 Claims, 9 Drawing Sheets

FIXED HYDRANT CART WITH NON-ARTICULATING COUPLING

BACKGROUND OF THE INVENTION

1. Field of the Invention

This invention relates to equipment for refueling aircraft at airports.

2. Description of the Related Art

Major airports are frequently constructed to have large-capacity underground supply systems for aircraft fuel. Access to the supply systems is by way of hydrants located below the airport surface but accessible from the surface of the airport. The hydrants are equipped with flow-control valves under the control of the operator of the refueler vehicle.

A refueler vehicle of the hydrant type includes the following: a fuel hydrant hose and means for coupling the hydrant hose to the hydrant; a pressurized air hose for coupling to the hydrant valve for controlling the open and close positions of the hydrant flow control valves, the air hose controllable by the operator from a remote position; at least one fuel delivery hose with a coupling to the aircraft intake valve; means for coupling the hydrant and delivery fuel hoses, including filtering and metering equipment; and a platform or deck for supporting the operator. Refuelers are discussed in U.S. Pat. No. 4,886,282, issued Dec. 12, 1989 to Wilkinson et al., which is incorporated by reference for its teachings on hydrant refuelers.

To accommodate different aircraft models having different wing heights, refuelers have typically included an elevator platform on which the operator stands when he connects the delivery fuel hose to the tank valve beneath the wing and during fuel delivery. The elevator platform may be of the scissors type. Elevator platforms have the undesirable feature of being prone to jamming or otherwise disabled, particularly in sub-freezing weather.

The Wilkinson U.S. Pat. No. 4,886,282 circumvented the problem of elevator platform failure by providing multiple non-elevating type platforms within the range of commercial wing heights. The non-elevating platforms offer greater mechanical reliability than the elevator type, but lack the convenient continual height adjustment which is possible with elevator type platforms.

Other failures in previous hydrant type refuelers are due to gas engine and power train problems. If the engine or power train fails, the entire refueler is rendered inoperable. It is known to separate the power module from the hydrant refueler, in a fashion analogous to the separation between the tractor and trailer in truck designs. Such a hydrant refuelers are referred to as a "fixed hydrant cart" because, once they are towed to their destination, they are deployed in a normally fixed position. Maneuvering a tractor with a fixed hydrant cart attached in a congested area near a plane requires a great deal of skill. For this reason, airport authorities have typically chosen mobile hydrant carts, and have accepted the disadvantages of risk of engine and drive train failure, and added EPA exhaust emissions in airports as preferable to the risk of injury and property damage which may occur using fewer tractors and fixed hydrant cart arrangements.

SUMMARY OF THE INVENTION

A hydrant refueler for refueling an aircraft, for use in an airport having a hydrant for supplying fuel. The hydrant refueler includes a hydrant cart and an all electric self propelled land vehicle, that eliminates EPA emissions. The hydrant cart has a fuel hose for coupling to the hydrant and a delivery fuel hose for coupling to a fuel intake valve of the aircraft. The self propelled land vehicle has a platform for supporting a refueling operator and controls for operating the land vehicle and raising and lowering the platform.

The hydrant cart is detachably coupled to the land vehicle. The coupling allows up and down movement between the land vehicle and hydrant cart, but prevents sideways pivoting between the land vehicle and hydrant cart. When the vehicle and cart are coupled, the front wheels of the cart are raised slightly above the ground.

One end of the delivery fuel hose is raised with the platform to a height for coupling with the aircraft fuel intake valve, conducting fuel to the airplane during operation. The land vehicle and hydrant cart are detached from one another for maintenance and repair.

DETAILED DESCRIPTION OF THE INVENTION

Overview

Figure 1:
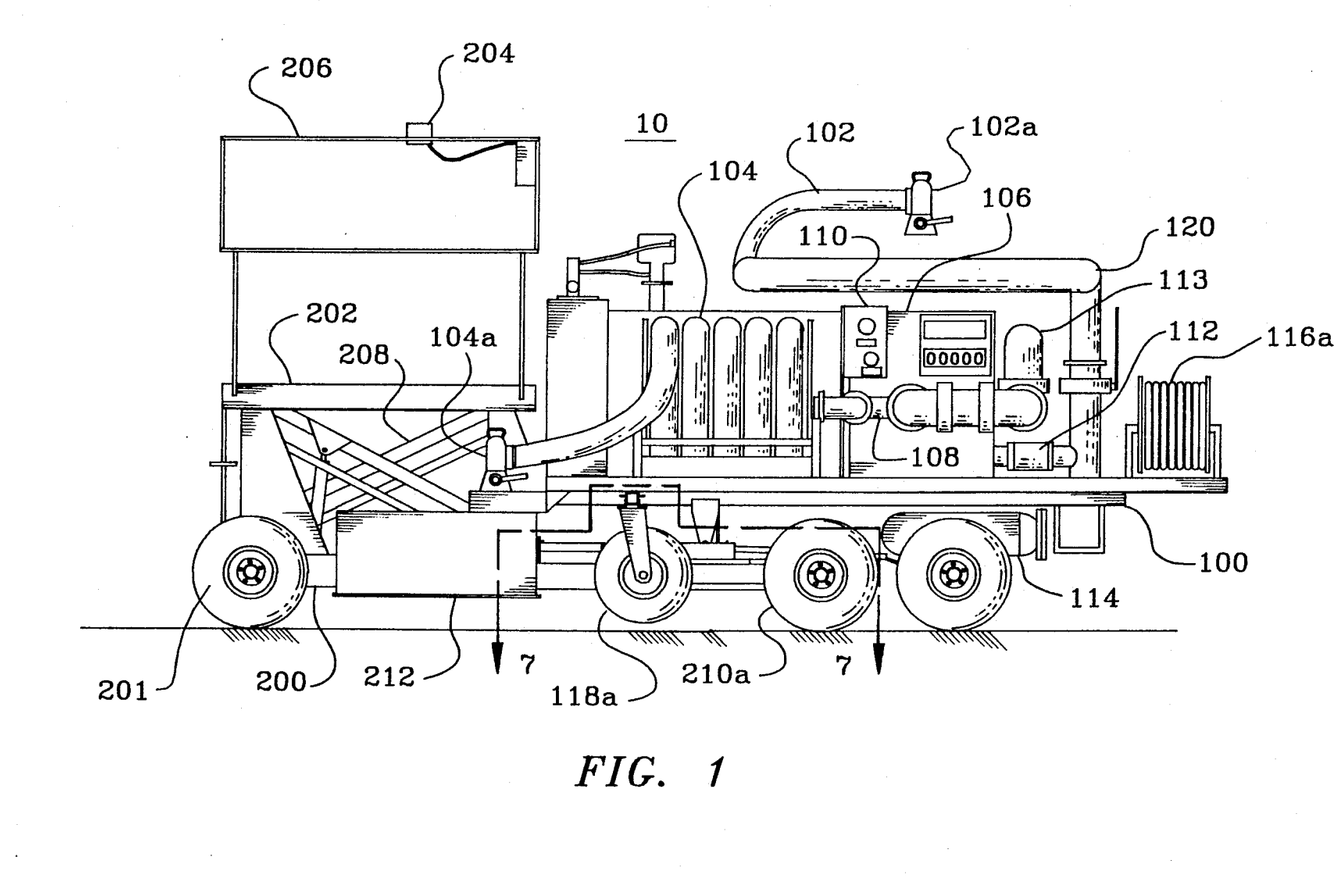
FIG. 1 shows an exemplary hydrant refueler in accordance with the invention.

FIG. 1 shows a hydrant refueler 10 in an accordance with the invention. The hydrant refueler includes two main components: a hydrant cart 100 and a land vehicle 200.

The hydrant cart 100 includes a fuel hose 102 which has at one end a coupling 102a for an airport hydrant (not shown), to receive fuel from the hydrant. The other end of fuel hose 102 connects to a control valve 112 and a fuel filter 106. A delivery fuel hose 104 is coupled at one end to valve 112, and has at its other end a coupling 104a which connects to the fuel intake valve (not shown) of an aircraft for fueling the aircraft.

The land vehicle 200 is self propelled, and in the exemplary embodiment, is powered by batteries which eliminates EPA emissions. Vehicle 200 has steerable wheels 201 at its front end. Vehicle 200 includes a platform 202 for supporting a refueling operator and a lift mechanism 208 for raising the platform 202. All controls 204 necessary to move vehicle 200 and raise and lower the platform 202 are located on the side guard railings 206 of the platform 202.

Figure 2:
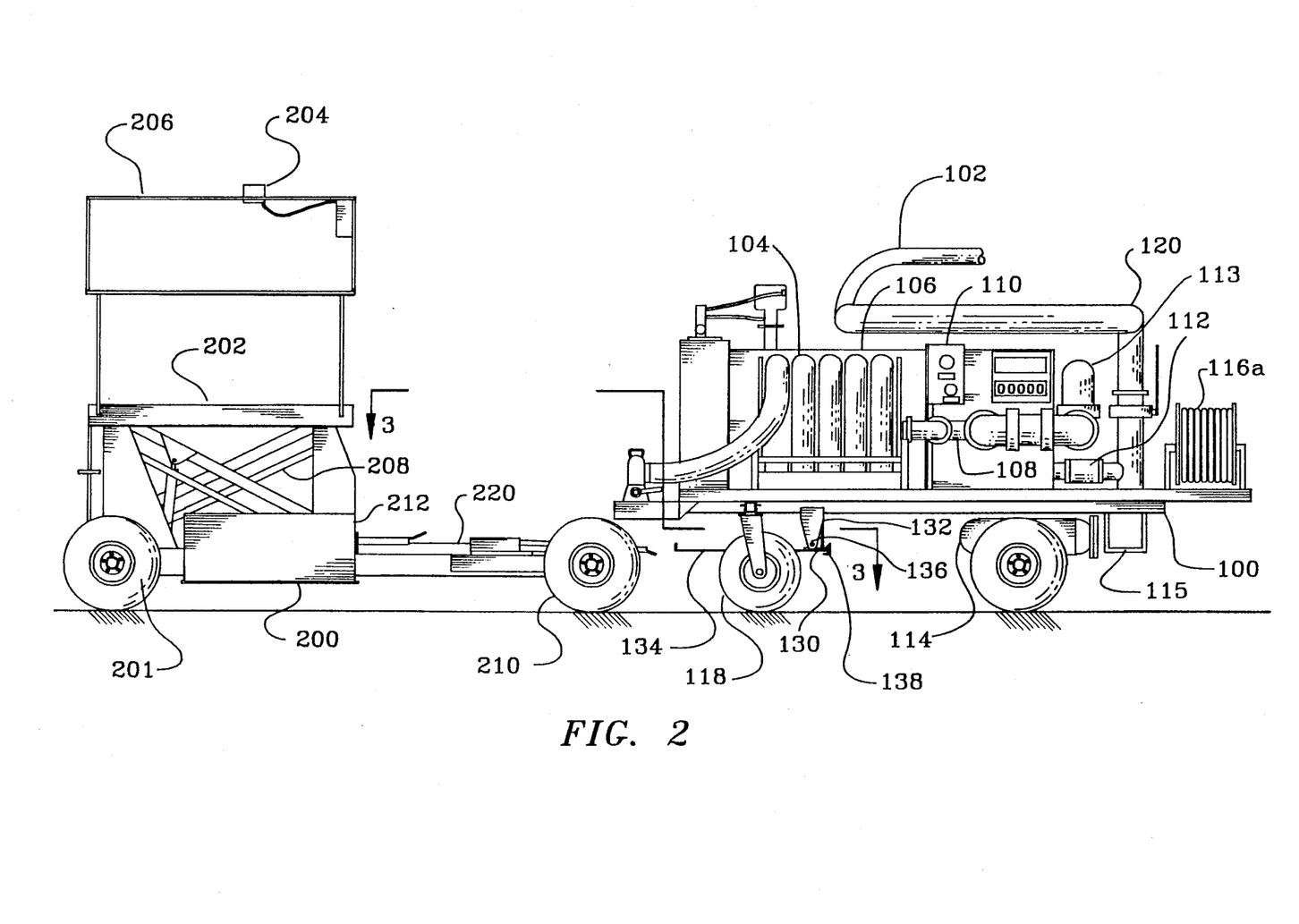
FIG. 2 shows the hydrant refueler of FIG. 1 separated into land vehicle and hydrant cart components.
Figure 3:
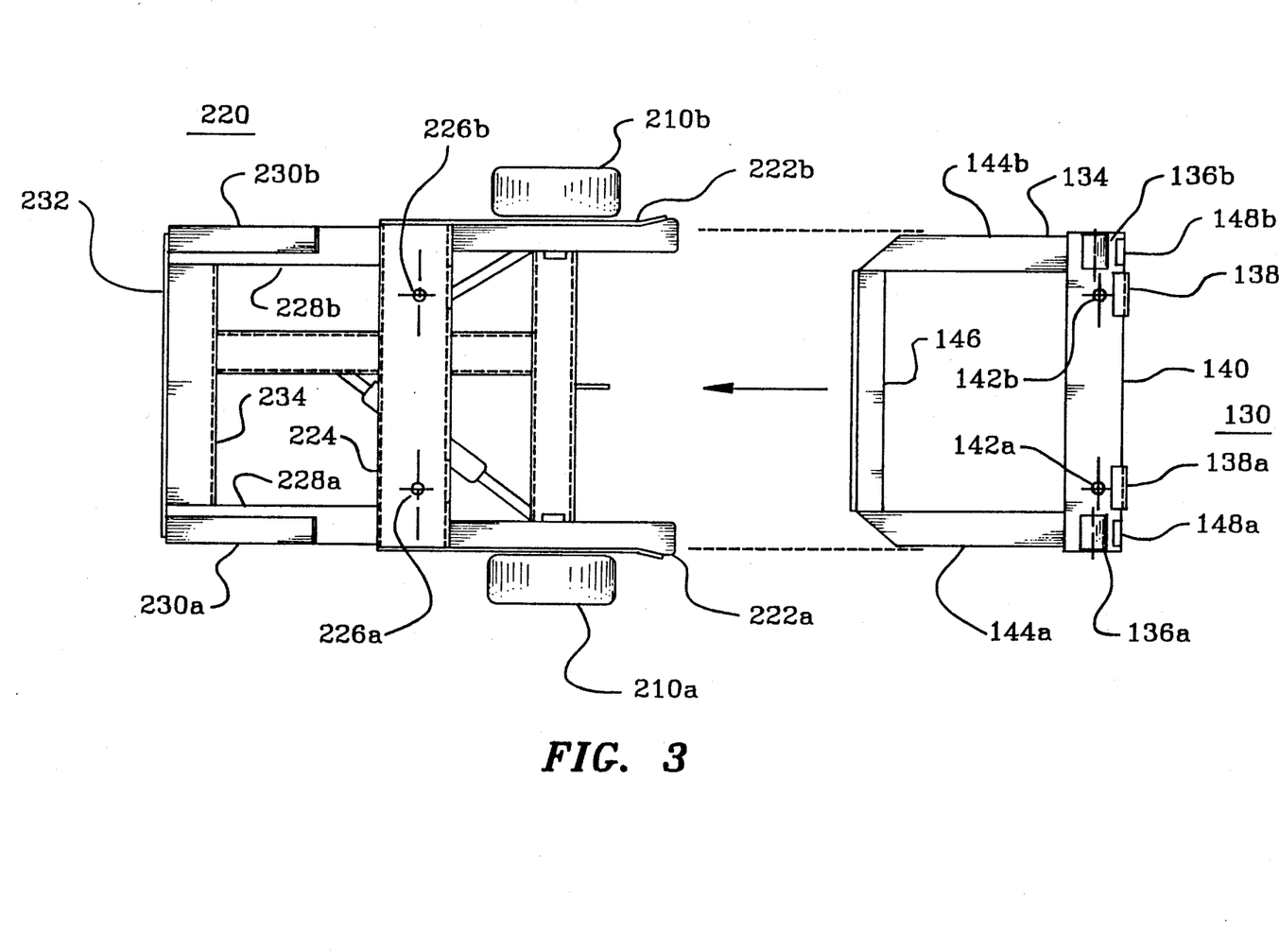
FIG. 3 is a sectional view of the assembly shown in FIG. 2.
Figure 4:
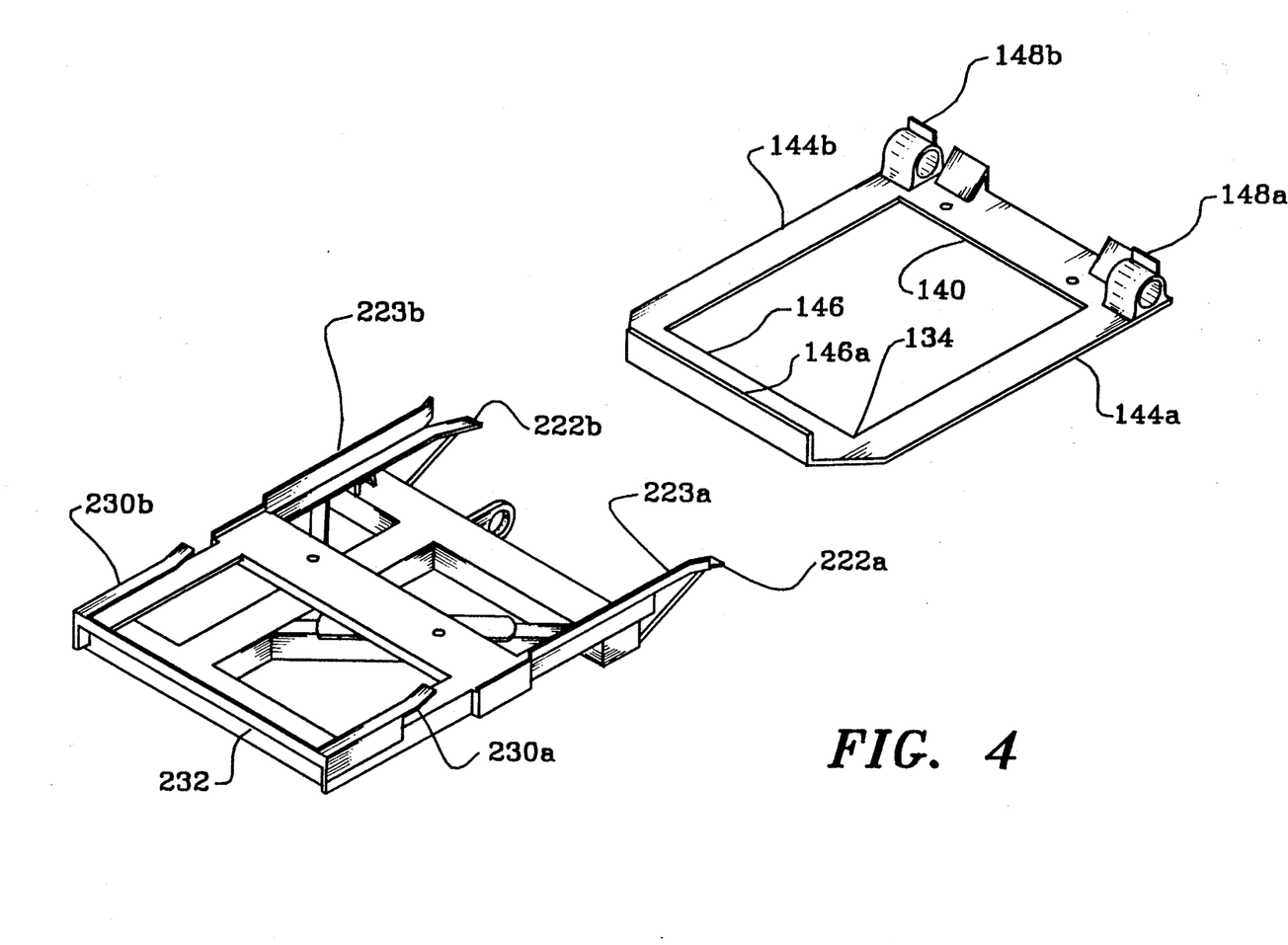
FIG. 4 is an isometric view of the coupling shown in FIG. 3.

Hydrant cart 100 and vehicle 200 are detachably coupled by a non-reciprocating coupling (130 and 220 as shown in FIGS. 2, 3 and 4). This coupling allows up and down pivoting movement between land vehicle 200 and hydrant cart 100, while preventing sideways pivoting between the vehicle and the cart.

Land vehicle 200 includes a rearwardly extending coupling platform 220 on which rear wheels 210a, 210b are located. Hydrant cart 100 includes front wheels 118a, 118b separated by a distance which is greater than the distance between rear wheels 210a and 210b. The rear wheels 210a, 210b pass between front wheels 118a, 118b when coupling cart 100 to vehicle 200, so that the front wheels are positioned on opposite sides of the rearwardly extending platform 220 when the vehicle 200 and cart 100 are coupled to one another. When vehicle 200 and cart 100 are coupled, the front wheels 118a, 118b of cart 200 are raised slightly off the ground, so that they do not interfere with steering the assembly.

DESCRIPTION OF THE EXEMPLARY EMBODIMENT

FIG. 2 shows the hydrant cart 100 separated from the land vehicle 200. The hydrant cart receives, filters, meters and delivers the fuel to the aircraft (not shown). The hydrant cart 100 includes a fuel hose 102 which has at one end a coupling 102a (shown in FIG. 1) for an airport hydrant, to receive fuel from the hydrant. The fuel hose 102 may be a sling hose produced such as those manufactured by Titan Industries, Inc. The other end of fuel hose 102 is connected by a pipe 120 to a pressure and flow control valve 112, which meters flow of fuel to a fuel filter 106. Valve 112 also includes a dead-man switch to cut off the flow of fuel in the event that the operator loses control of the fuel flow. At the end of pipe 120 a surge suppressor 114 is connected, to reduce the impact of pressure and flow variations on flow to the fuel hose 102.

A pipe 113 carries fuel from the exit port of the fuel filter 106 to a venturi 108, which measures the total volume of fuel pumped. Fuel pressure is also measured and provided by a gauge 110. A delivery fuel hose 104 is coupled at one end to metering valve 112, and has at it other end a coupling 104a which connects to the fuel intake valve (not shown) of an aircraft for fueling the aircraft.

Two reels of pneumatic hose 116a and 116b (shown in FIG. 6) are provided, to allow the operator to control the fuel delivery. One end of each hose is connected to a tank 115 which contains pressurized air. The other end of the first hose 116a is connected to the dead-man switch in valve 112a, which is biased closed when the air pressure is relieved. The other end of the second hose 116b is held closed by a manually operated lever to allow the fuel to flow. When the operator releases this lever, the air pressure in hoses 116a and 116b is relieved and the fuel flow is cut off.

The hydrant cart includes a coupling 130 for attachment to the land vehicle 200. This coupling is shown in plan view in FIGS. 3 and 7, in isometric view in FIGS. 4 and 5, and in cross section in FIGS. 8 and 9. The coupling will be discussed in detail below.

Referring again to FIG. 2, the land vehicle 200 is an electrically powered, self propelled serial work platform, such as the Strato-lift platform, manufactured by Stratolift, Inc., which has been modified to couple with the cart 100, as described below. The vehicle 200 includes a platform 202 for supporting a refueling operator and a scissor-type lift mechanism 208 for raising the platform 202. Side guard railings 206 protect the operator against falling while the platform 202 is elevated. All controls 204 necessary to move vehicle 200 and raise and lower the platform 202 are located on the side guard railings 206 of the platform 202. The land vehicle is powered by heavy duty batteries (not shown) located inside a component area 212. Vehicle 200 has steerable front wheels 201 at its front end.

The rear portion 220 of the land vehicle 200 is elongated to extend under and couple with the hydrant cart 100. This rear portion 220 is shown in plan view in FIGS. 3 and 7, in cross section in FIGS. 8 and 9, and in isometric view 4.

To couple the land vehicle 200 and hydrant cart 100, the cart remains still while the land vehicle is backed up towards the cart. As shown in FIGS. 3 and 4, the rear coupling portion 220 of land vehicle 200 includes two inclined guide pieces 222a and 222b, with respective vertical guide pieces 223a and 223b. Guide pieces 222a, 222b, 223a and 223b receive the coupling 130 of the hydrant cart 100. As vehicle 200 moves towards cart 100, tongue 134 enters rear coupling portion 220.

The coupling 130 includes a tongue 134 formed of two side pieces 144a and 144b, a front piece 146 connecting the two side pieces, and a back piece 140. The back piece 140 has two tubular sleeves 136a, 136b for pivotably mounting the tongue 134 to the underside of cart 100. The tongue 134 is adapted to slide onto the two inclined guide pieces 222a and 222b. Two vertical stops 148a and 148b are disposed on back piece 140, behind respective sleeves 136a and 136b, to limit the range of angles through which tongue 134 can pivot. This limited angular range ensures that tongue 134 does not drop below the guide pieces 222a and 222b when the cart 100 and vehicle 200 are detached. Thus, no manual adjustment to the tongue 134 angle is necessary to prepare the cart 100 for coupling with the vehicle 200. The front corner of each side piece 144a, 144b is beveled to facilitate insertion between the vertical guide pieces 223a and 223b.

As the tongue 134 slides up guide pieces 222a and 222b towards the vehicle 200, the front end of hydrant cart 100 is lifted slightly, so that the front wheels 118a, 118b of the hydrant cart do not bear the weight of cart 100. This is shown in FIG. 1, in which wheel 118a clears the surface of the ground. Thus wheels 118a and 118b do not interfere with steering the combined vehicle-cart assembly. Referring again to FIGS. 3 and 4, as the land vehicle 200 continues moving towards the hydrant cart 100, the two side pieces 144a, 144b slide into sleeves 230a and 230b. When the front piece vertical member 146a of tongue 134 reaches the front stop piece 232 of coupling 220, the tongue 134 is in its final coupled position.

Figure 5:
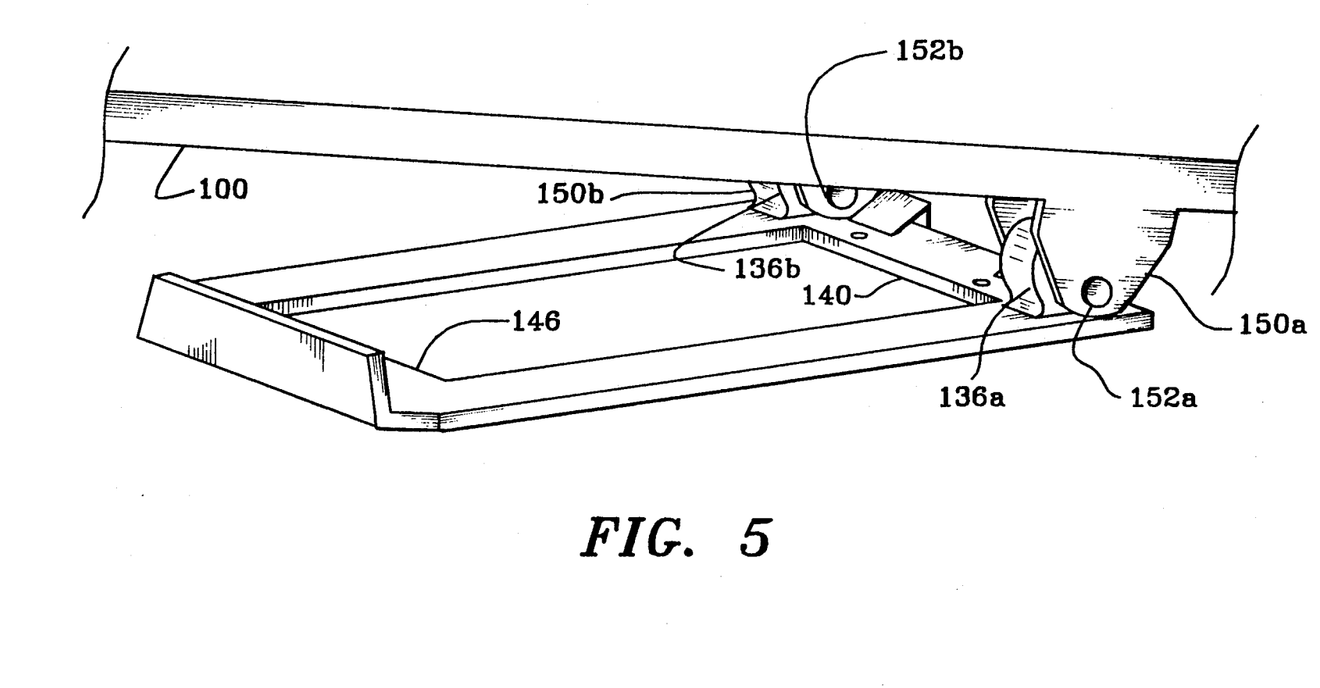
FIG. 5 is an isometric view of one of the coupling components shown in FIG. 3.

FIG. 5 shows coupling assembly 130 pivotably mounted to the underside of cart 100. Sleeves 136a and 136b are attached to back piece 140. Sleeves 136a and 136b are held by pins 152a and 152b to respective vertical mounting pieces 150a and 150b. Vertical stops 148a and 148b (shown in FIG. 4) limit the pivot angle to prevent the front piece 146 from dropping below a height for sliding onto guide pieces 222a and 222b.

Figure 7:
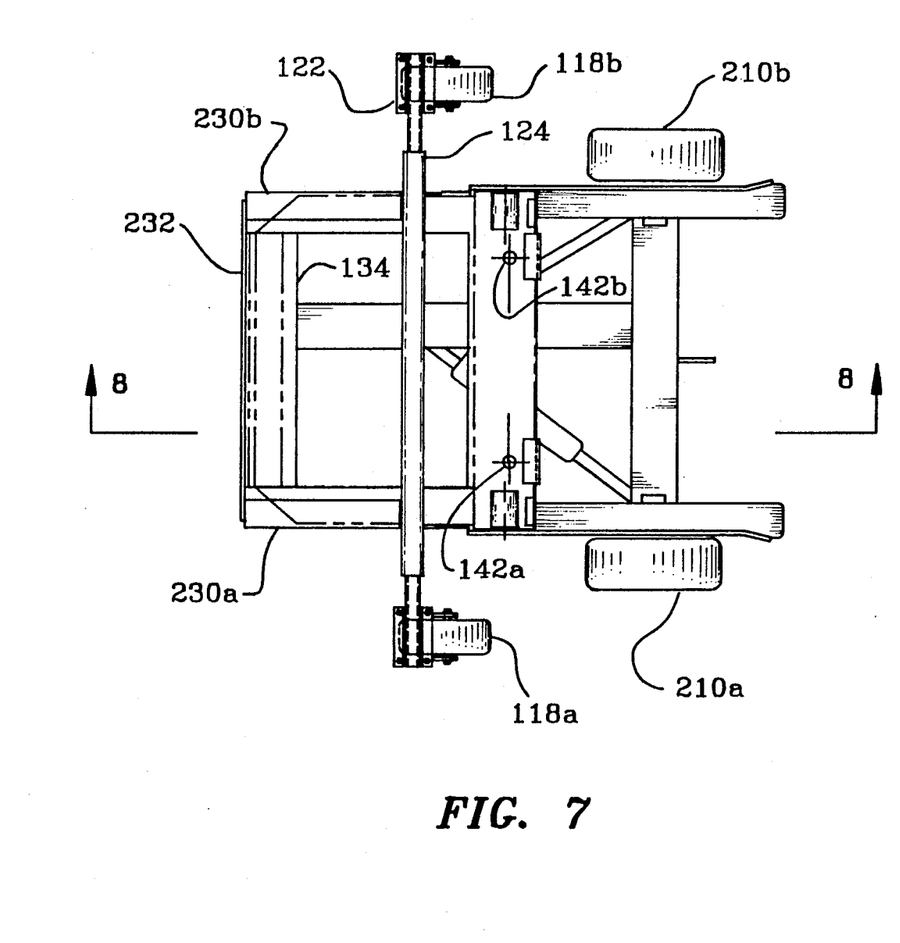
FIGS. 7 and 8 are sectional views of the coupling in FIG. 1.

FIG. 7 shows the coupling portions 130 and 220 of cart 100 and vehicle 200 in plan view, when cart 100 and vehicle 200 are coupled. Holes 142a and 142b line up with respective holes 226a and 226b (shown in FIG. 3). Tongue 134 is held in place by sleeves 230a and 230b, which prevent the front of tongue 134 from lifting up. Also shown are the relative positions of cart front wheels 118a and 118b, and vehicle rear wheels 210a and 210b. Rear wheels 210a and 210b fit in between and behind front wheels 118a and 118b.

Figure 8:
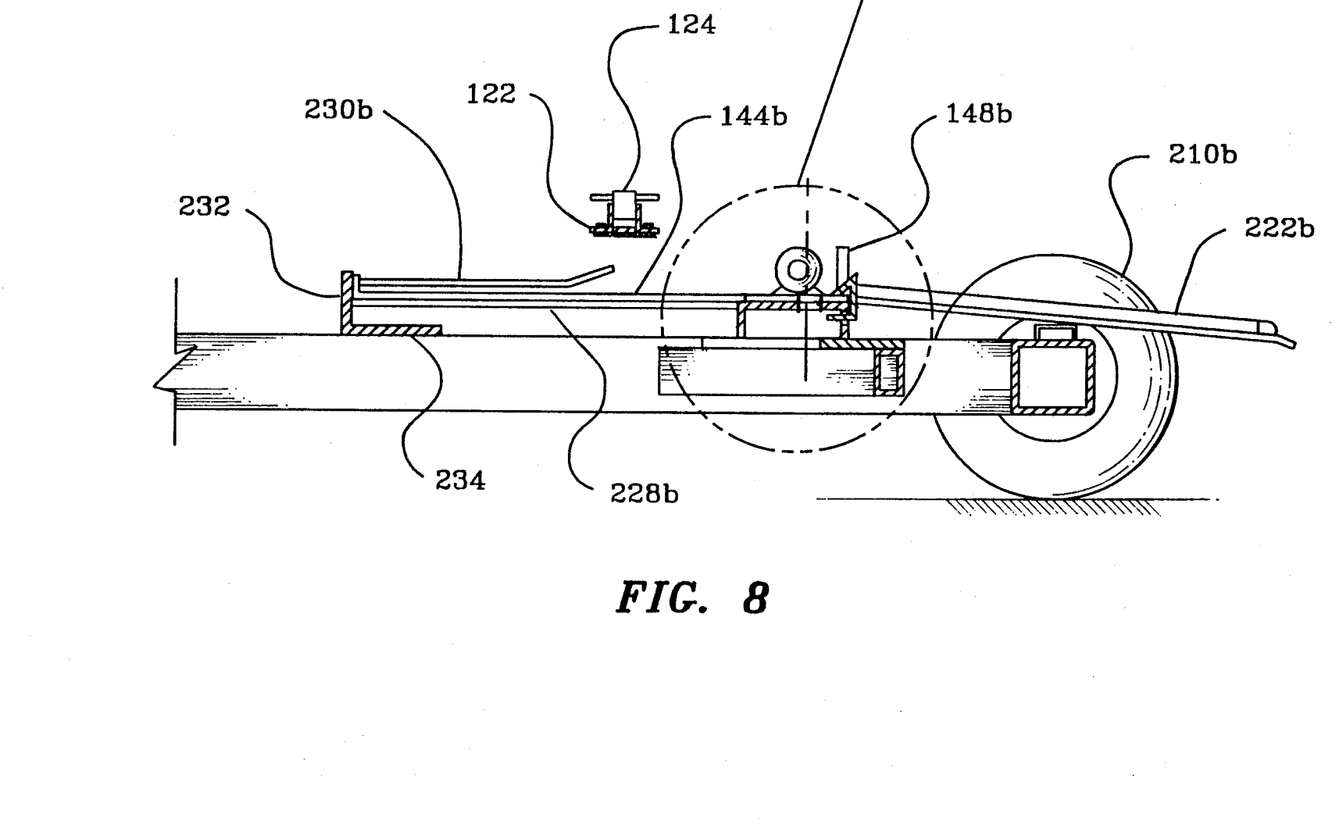
Figure 9:
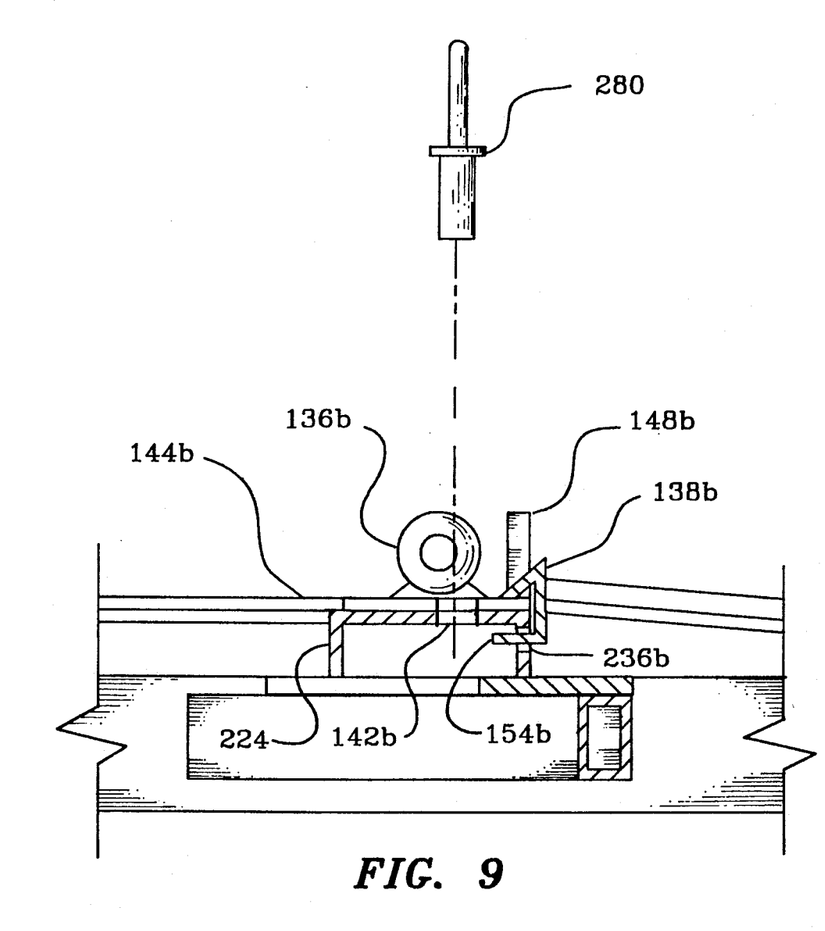
FIG. 9 shows a detail from FIG. 8.

As shown in FIGS. 8 and 9, back piece 140 includes horizontal members 154a (not shown) and 154b 7hich extend into respective slots 236a (not shown) and 236b of coupling 220 to prevent the rear piece 140 of tongue 134 from lifting up out of the coupling 220. As shown in FIG. 9, Holes 226a (shown in FIG. 3) and 226b in coupling 220 are aligned with respective holes 142a (shown in FIG. 3) and 142b of the back piece 140. A pin assembly 280 is dropped into place to prevent the cart 100 and vehicle 200 from separating in the horizontal direction, and to effectively prevent the cart 100 from turning or pivoting sideways with respect to the vehicle 200.

During normal use, vehicle 200 is attached to hydrant cart 100 for transporting the cart to the aircraft to be refueled, as shown in FIG. 1. The coupling 104a of the delivery fuel hose is raised with platform 202 to a height for coupling with the aircraft fuel intake valve (not shown). For maintenance and repairs, the land vehicle 200 and the hydrant cart 100 are detached from one another, as shown in FIG. 2. An apparatus in accordance with the invention is not disabled if vehicle 200 requires repairs. Another land vehicle in accordance with the invention may be substituted for the unit which is being repaired. The hydrant cart 100 is a free-standing unit, which may be moved manually when decoupled from vehicle 200 if necessary.

In an airport with multiple carts 100 and vehicles 200, savings may be realized by using fewer vehicles 200 than carts 100. If the airport has one or more planes having fuel intake valves which are reachable from the ground, a cart 100 may be towed to the airplane by vehicle 200, and decoupled from the vehicle 200. Vehicle 200 is then free to tow another hydrant cart 100 to a different airplane.

Figure 6:
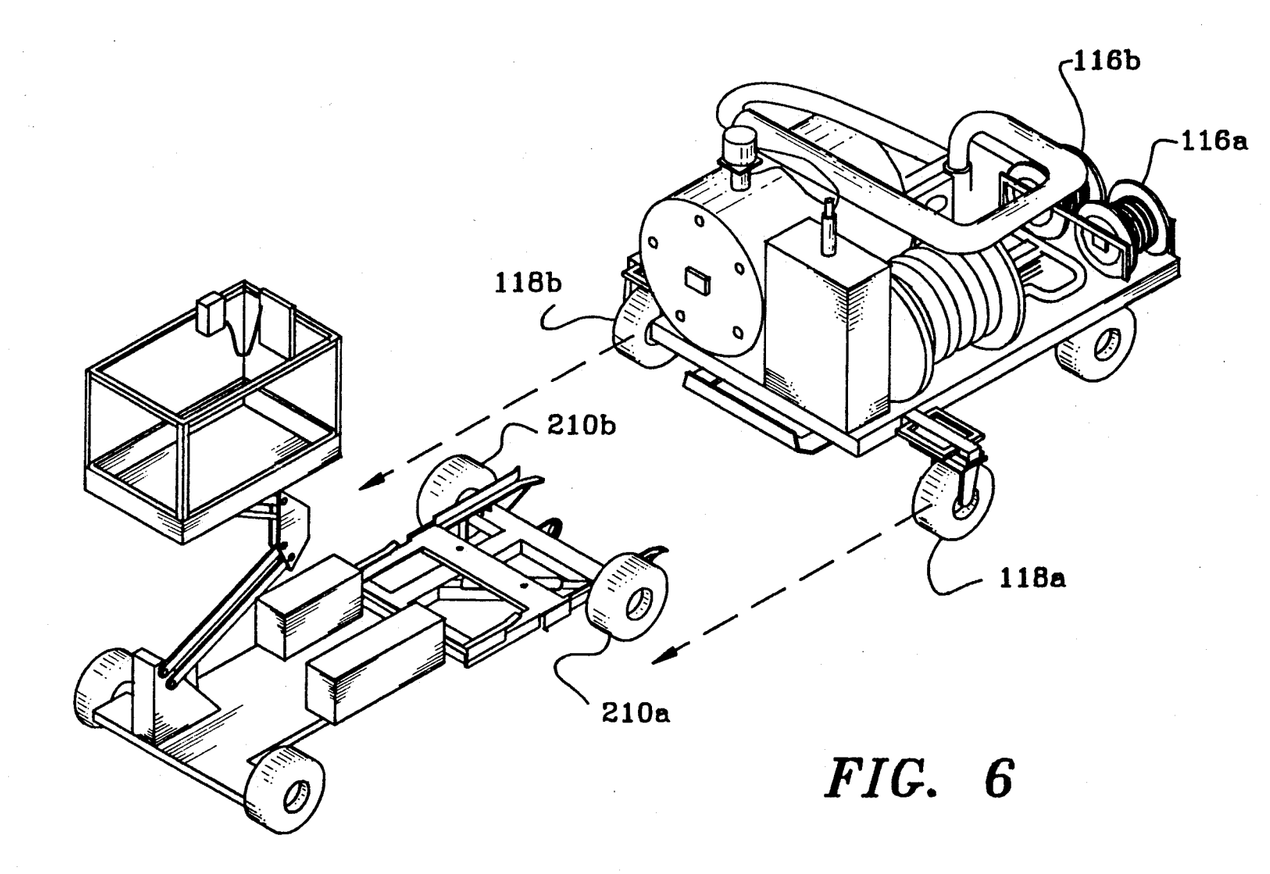
FIG. 6 is an isometric view of the assembly shown in FIG. 2.

As shown in FIG. 6, the hydrant cart front wheels 118a, 118b are separated by a distance which is greater than the distance between rear wheels 210a and 210b. The rear wheels 210a, 210b pass between front wheels 118a, 118b when coupling cart 100 to vehicle 200, so that the front wheels 118a, 118b are positioned in front of the rear wheels 210a, 210b of the vehicle 200, as shown in FIG. 1. The hydrant cart 100 front wheels 118a, 118b are positioned on opposite sides of the rearwardly extending platform 220 when the vehicle 200 and cart 100 are coupled to one another.

Because rear wheels 210a and 210b fit between front wheels 118a and 118b and when coupled, front wheels 118a and 118b are lifted off the ground. There is no need to retract the front wheels 118a and 118b when coupling cart 100 and vehicle 200. There is no need to have retractable landing gear, which are commonly used in tractor-trailer type vehicles. Having fixed front wheels also simplifies the coupling procedure.

It is understood by one skilled in the art that many variations of the embodiments described herein are contemplated. While the invention has been described in terms of exemplary embodiments, it is contemplated that it may be practiced as outlined above with modifications within the spirit and scope of the appended claims.

What is claimed:

1. A hydrant refueler for refueling an aircraft by a refueling operator for use in an airport wherein the airport has a hydrant for supplying fuel, the hydrant refueler comprising:

a hydrant cart including a fuel hose having at one end means for coupling to said hydrant, a delivery fuel hose having at one end means for coupling to a fuel intake valve of said aircraft, and means for coupling the other end of said fuel hose to the other end of said delivery fuel hose;

a self propelled land vehicle including controls for operating said land vehicle, a platform for supporting a refueling operator, and means for raising and lowering said platform between a minimum height and a maximum height; and means for detachably coupling said hydrant cart to said land vehicle, including means for preventing sideways pivoting between said land vehicle and said hydrant cart, wherein said one end of said delivery fuel hose is raised with said platform to a height for coupling with said aircraft fuel intake valve for conducting fuel to the airplane during operation.

2. A hydrant refueler in accordance with claim 1, in which said coupling means include:

pivoting means for providing up and down movement between said land vehicle and said hydrant cart.

3. A hydrant refueler for refueling an aircraft by a refueling operator for use in an airport wherein the airport has a hydrant for supplying fuel, the hydrant refueler comprising:

a hydrant cart including a fuel hose having at one end means for coupling to said hydrant, a delivery fuel hose having at one end means for coupling to a fuel intake valve of said aircraft, and means for coupling the other end of said fuel hose to the other end of said delivery fuel hose;

a self propelled land vehicle including controls for operating said land vehicle, a platform for supporting a refueling operator, and means for raising and lowering said platform between a minimum height and a maximum height, said land vehicle including a rearwardly extending platform with rear wheels separated by a first distance; and means for detachably coupling said hydrant cart to said land vehicle, wherein said one end of said delivery fuel hose is raised with said platform to a height for coupling with said aircraft fuel intake valve for conducting fuel to the airplane during operation, and wherein said hydrant cart includes front wheels separated by a second distance which is greater than said first distance so that said rear wheels pass between said front wheels when coupling said hydrant cart to said land vehicle, whereby said front wheels are positioned on opposite sides of said rearwardly extending platform when said land vehicle and hydrant cart are coupled to one another.

4. A hydrant refueler in accordance with claim 3, in which said front wheels are raised when said land vehicle and hydrant cart are coupled to one another.

5. A hydrant refueler for refueling an aircraft by a refueling operator for use in an airport wherein the airport has a hydrant for supplying fuel, the hydrant refueler comprising:

a hydrant cart including a fuel hose having at one end means for coupling to said hydrant, a delivery fuel hose having at one end means for coupling to a fuel intake valve of said aircraft, and means for coupling the other end of said fuel hose to the other end of said delivery fuel hose;

a self propelled land vehicle including a platform for supporting a refueling operator while moving the cart and during refueling, means for raising and lowering said platform between a minimum height and a maximum height, and controls for transporting the vehicle and for raising and lowering the platform, the controls mechanically coupled to the platform and moveable therewith; and means for detachably coupling said hydrant cart to said land vehicle, wherein said one end of said delivery fuel hose is raised with said platform to a height for coupling with said aircraft fuel intake valve for conducting fuel to the airplane during operation.

* * * * *